United States Patent [19]
Wheeler et al.

[11] Patent Number: 5,426,270
[45] Date of Patent: * Jun. 20, 1995

[54] FLUID NOISE MUFFLER AND METHOD OF MANUFACTURE

[75] Inventors: John H. Wheeler, Dallas, Tex.; Jimmy P. Frentzos, Plantation, Fla.

[73] Assignee: The Texacone Company, Mesquite, Tex.

[*] Notice: The portion of the term of this patent subsequent to Apr. 14, 2009 has been disclaimed.

[21] Appl. No.: 87,962

[22] Filed: Jul. 6, 1993

Related U.S. Application Data

[63] Continuation of Ser. No. 804,028, Dec. 9, 1991, abandoned, which is a continuation of Ser. No. 649,597, Feb. 1, 1991, Pat. No. 5,103,929.

[51] Int. Cl.$^6$ .................................... F16L 55/02
[52] U.S. Cl. .................................. 181/233; 181/221
[58] Field of Search ............... 181/212, 233, 247, 258, 181/252, 223, 221, 256; 251/127; 417/312, 540

[56] References Cited

U.S. PATENT DOCUMENTS

| | | | |
|---|---|---|---|
| 2,523,260 | 9/1950 | Campbell | 181/256 |
| 2,936,790 | 5/1960 | Dahl et al. | 181/233 |
| 3,033,306 | 5/1961 | Hallene et al. | 181/233 |
| 3,165,166 | 1/1965 | Hall | 181/233 |
| 3,251,434 | 5/1966 | Roenick | 181/233 |
| 4,154,265 | 5/1979 | Holsomback | 181/270 |
| 4,314,621 | 2/1982 | Hansen | 181/233 |
| 4,617,962 | 10/1986 | Brunner | 181/233 |
| 5,101,930 | 4/1992 | Fargo et al. | 181/233 |
| 5,103,929 | 4/1992 | Wheeler et al. | 181/233 |

Primary Examiner—M. L. Gellner
Assistant Examiner—Eddie C. Lee
Attorney, Agent, or Firm—Michael A. O'Neil

[57] ABSTRACT

A muffler for reducing fluid flow noise in a hydraulic system comprises a cylindrical elastomer insert having multiple reinforced flow ports with different diameter porting, internal air chambers, and cast from an elastomer mixed with hollow glass spheres to form an insert of 40 percent air by volume. The insert is placed within a housing and connected to the hydraulic pipe assembly for receiving fluid under pressure and diverting it through the multiple flow ports of the insert wherein flow sounds, pump surges, and flushing noises of the hydraulic system are muffled by the disruption of the flow through the flow ports, the absorption by the internal air chambers, and the absorption by microspheres created by the hollow glass spheres in the elastomer insert.

2 Claims, 3 Drawing Sheets

FLUID NOISE MUFFLER AND METHOD OF MANUFACTURE

CROSS REFERENCE

This application is a file wrapper continuation of U.S. Application Ser. No. 07/804,028 filed on Dec. 9, 1991, entitled FLUID NOISE MUFFLER AND METHOD OF MANUFACTURE, abandoned, which was a continuation of U.S. Application Ser. No. 07/649,597, filed Feb. 1, 1991, entitled FLUID NOISE MUFFLER AND METHOD OF MANUFACTURE, U.S. Pat. No 5,103,929.

TECHNICAL FIELD

This invention relates generally to apparatus for reducing fluid flow noise in a hydraulic system, and more particularly to a muffler for reducing fluid flow noise in a hydraulic elevator and the method of manufacture.

BACKGROUND AND SUMMARY OF THE INVENTION

Historically, one of the major disadvantages in the use of hydraulic elevators has been the noise and vibration generated by the rapid flow of fluid under pressure throughout the hydraulic system. As a result, elevator manufacturers are required to install muffling devices into the hydraulic system to reduce the fluid flow noise and vibration.

Muffler systems historically utilized with hydraulic elevators have consisted of complex devices for diverting the flow of fluid to thereby reduce the flow noise. Such devices have failed to alleviate the noise and vibration problems and have been costly to manufacture, thereby resulting in higher elevator costs.

The present invention overcomes the above and other problems associated with the prior art. The muffler and method of manufacturing the muffler of the present invention result in an effective and cost efficient apparatus for splitting the flow of fluid in a hydraulic system to reduce the fluid noise and vibration. The muffler includes a housing for a cast urethane insert having two different sized flow ports extending longitudinally through the insert for splitting the flow of fluid as it enters the housing. The housing is substantially larger in diameter than the fluid path of the hydraulic system and includes adapters for connecting to the system fluid lines. Embedded within the urethane insert are hollow chambers extending parallel to the flow ports for absorbing the vibration and sound waves traveling through the fluid as it flows under pressure through the system. Additionally, the urethane insert includes 40 percent microspheres, resulting in a urethane product that is 40 percent air by volume to further increase absorption of the vibration and sound waves traveling through the fluid.

In the manufacturing process the microspheres are created by adding hollow glass spheres to the urethane prepolymer prior to casting the urethane insert. Thus, the microspheres created by the glass spheres not only act as filler to reduce the amount of urethane used in the insert, but also act as additional vibration and sound absorption cavities within the insert, thereby increasing the effectiveness and reducing the cost of the muffler, and, thus, the cost of the elevator.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION OF THE INVENTION

Figure 1:
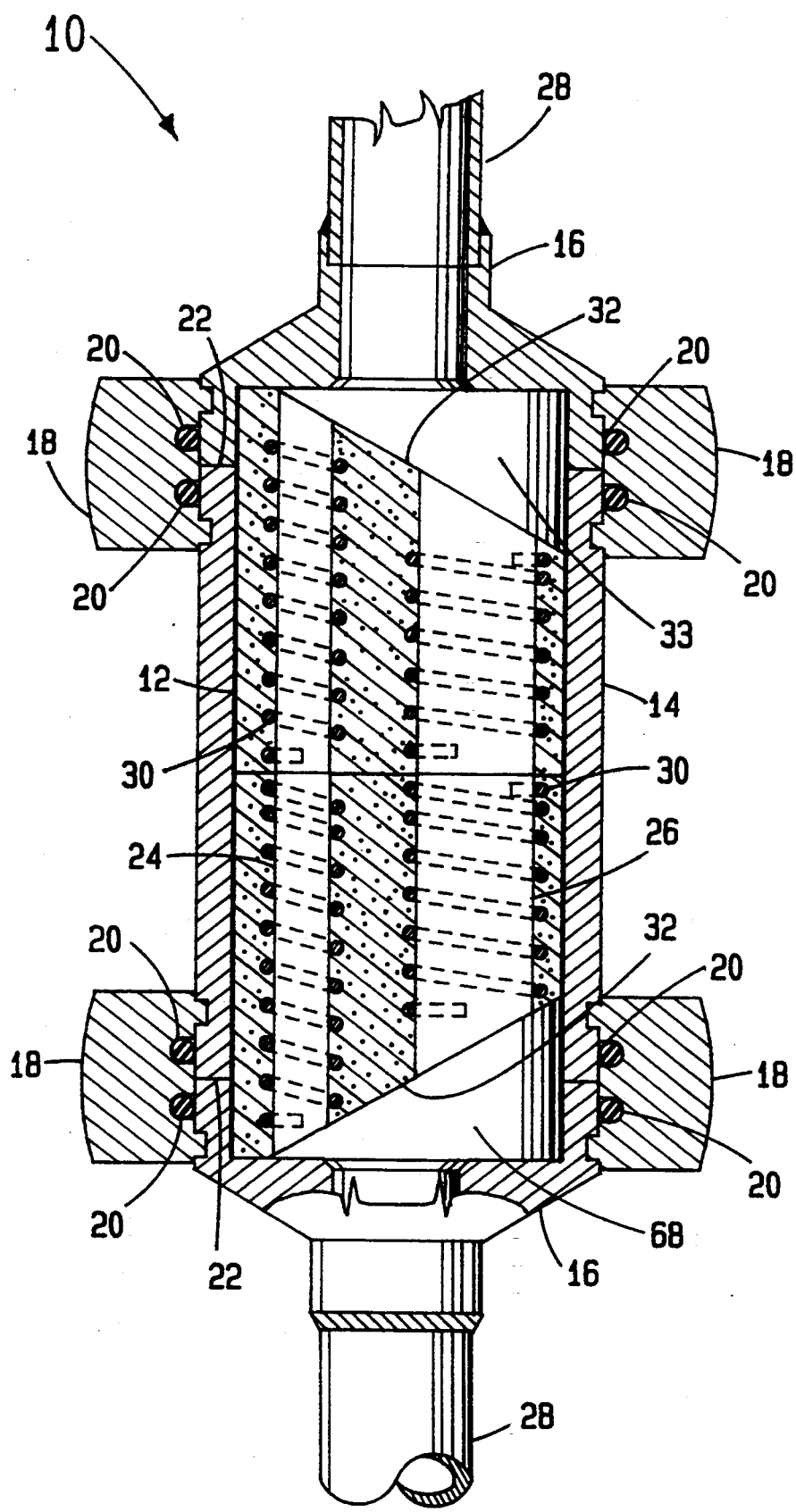
FIG. 1 is a partial sectional view of the muffler of the present invention.

Referring now to the drawings and in particular to FIG. 1, there is shown a sectional view of a muffler incorporating the present invention. A cylindrical elastomer insert 12 is contained within a cylindrical housing 14. The housing 14 has pipe adapters 16 attached to the opposed ends of the housing 14 through use of seal clamps 18 having seals 20 aligned therein for positioning on each side of the mating point 22 of the housing 14 and pipe adapters 16 to prevent fluid leakage from the mating point 22. The insert 12 has a first flow port 24 and a second flow port 26 for splitting the flow of the fluid as it enters the housing 14 through the pipe adapter 16 from the pipe assembly 28 of a hydraulic system. Although any of a number of elastomers may be used in casting the insert 12, in the preferred embodiment of the invention a urethane with hardness from shore A to shore D is used. Although any of a number of types of housing may be used, in the preferred embodiment of the invention, the insert is housed in a victaulic coupling.

The first and second flow ports 24 and 26, respectively, of the insert 12 are reinforced with steel compression springs 30 to prevent collapse of the insert 2 upon introduction of fluid under pressure into the housing 14. To further reduce the possibility of collapse and aid in the disruption of the fluid flow, the insert 12 has inclined ends 32, as further illustrated in FIG. 4, to allow pooling of the fluid in an area 33 within the housing 14 defined by the inclined end 32 of the insert 12 and the housing wall.

Figure 4:
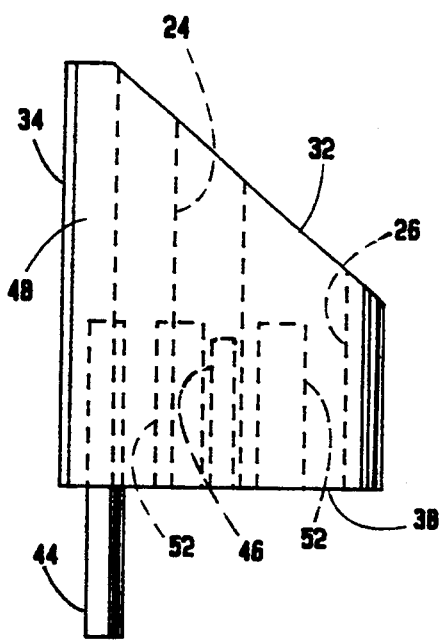
FIG. 4 is a side view of the male half of the urethane insert of FIG. 2.
Figure 5:
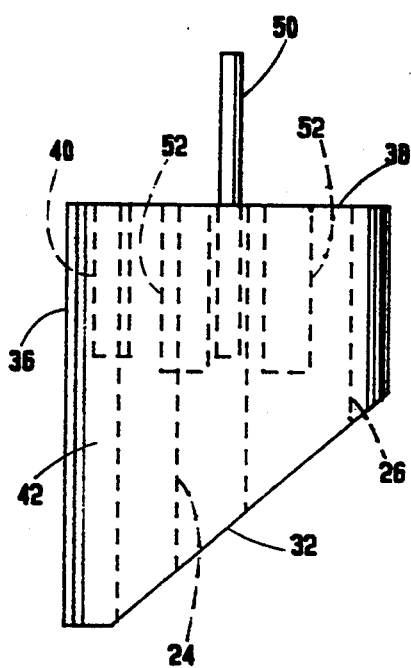
FIG. 5 is a side view of the female half of the urethane insert of FIG. 2.
Figure 2:
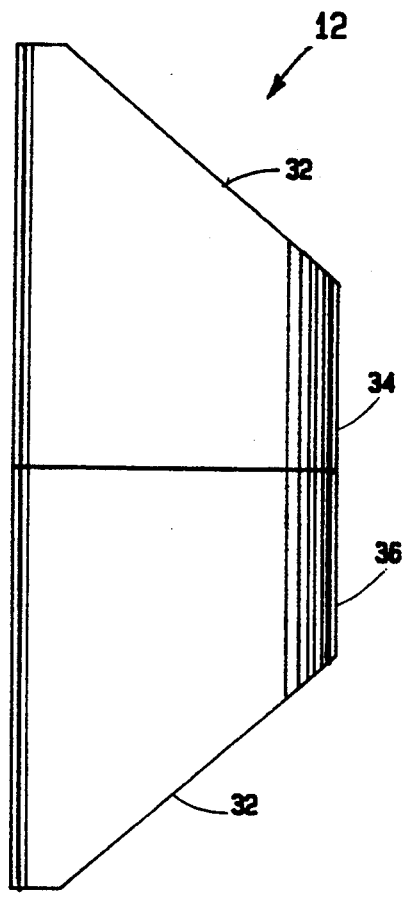
FIG. 2 is a side view of the urethane insert of the muffler of FIG. 1.

As shown in FIGS. 2, 4, and 5, the elastomer insert 12 is made of a cylindrical male half 34 and a cylindrical female half 36, each having a flat end 38 and an inclined end 32. The female half 36 has a cavity 40, shown in broken lines in FIG. 5, extending from the flat end 38 into the body 42 of the female half 36 for matingly receiving a dowel 44 extending outwardly from the flat end 38 of the male half 34. Likewise, the male half 34 has a cavity 46, shown in broken lines in FIG. 4, extending into the body portion 48 of the male half 34 for matingly receiving a dowel 50 extending outwardly from the flat end 38 of the female half 36 of the insert 12. Thus, the dowel joints of the male and female halves 34 and 36, respectively, secure proper alignment of the first flow port 24 and second flow port 26 when the halves are matingly connected to form the insert 12 as shown in FIG. 2.

Figure 3:
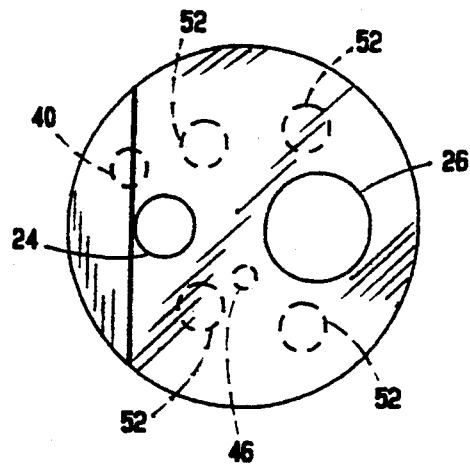
FIG. 3 is a top view of the urethane insert of FIG. 2.

As illustrated in FIGS. 3, 4, and 5, in addition to the first flow port 24, the second flow port 26 and the cavities 40 and 46 for receiving the dowels 44 and 50, respectively, air chambers 52 extend from the flat ends 38 into the body 42 of the female half 36 and into the body 48 of the male half 34 to a predetermined depth such that upon attachment of the two halves the air chambers are aligned to form fully enclosed hollow chambers within the body of the insert 12 to further absorb vibration and sound waves traveling through the fluid as it flows under pressure through the pipe assembly 28.

Figure 6:
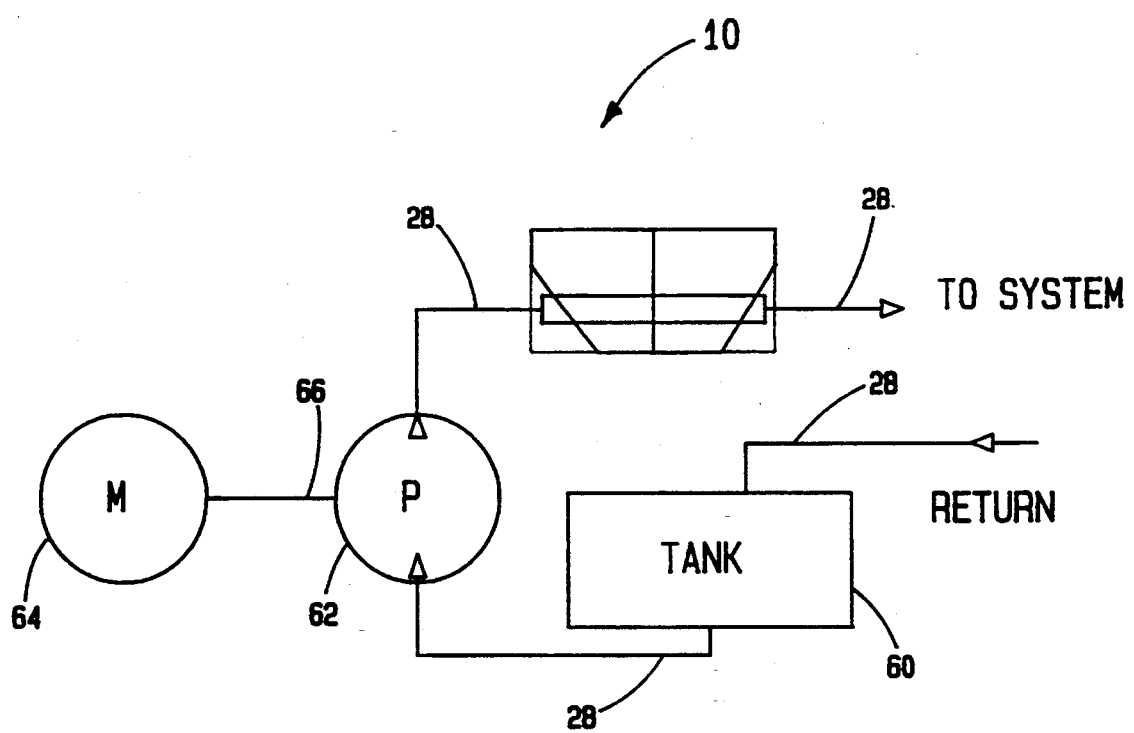
FIG. 6 is a schematic drawing of a hydraulic system incorporating the muffler of FIG. 1.

Referring now to FIG. 6, in a typical hydraulic system, oil from a tank 60 is fed through the pipe assembly 28 to a pump 62 driven by a motor 64 through a drive shaft 66. From the pump 62 the oil is forced under pressure through the pipe assembly 28, through the pipe adapter 16 into the cylindrical housing 14, having a diameter substantially larger than the diameter of the pipe assembly 28, and diverted into the first flow port 24 and the second flow port 26 to split the flow of the fluid into two small passageways having a combined internal diameter equal to the internal diameter of the pipes of the pipe assembly 28. Fluid then exits the first flow port 24 and the second flow port 26 into an area 68 in the housing 14 defined by the inclined end 32 of the insert 12 and the wall of the housing 14, through the pipe adapter 16 to be returned to the pipe assembly 28 for delivery of the fluid to the hydraulic system. The fluid subsequently returns through the pipe assembly 28 to the tank 60 for continuous cycling of the fluid through the system.

The design and process for manufacturing the elastomer insert 12 allow for reduced production costs of the muffler, thereby reducing the cost of the elevator on which the muffler is employed. The male and female halves 34 and 36, respectively, are manufactured by cleaning the compression springs 30, by sandblasting or otherwise, and placing them into a heated mold. Although springs of varying diameters may be used for the first and second flow ports 24 and 26, respectively, in the preferred embodiment of the invention, a $\frac{1}{4}$ inch wire compression spring is positioned in the mold to reinforce the first flow port 24 and a 3/16 inch wire compression spring is positioned in the mold to reinforce the second flow port 26.

An elastomer pre-polymer is then degassed and mixed with hollow glass spheres, preferably of a type manufactured by 3M under the trade name Scotchlite Glass Bubbles, for 1 minute. Although any of a number of elastomer pre-polymers will achieve the desired result, in the preferred embodiment of the invention, a urethane pre-polymer is used. The evenly distributed hollow glass spheres act not only as filler to reduce the amount of pre-polymer required to form the insert 12, but also form microspheres in the elastomer to result in a finished product being 40 percent air by volume. Thus, in addition to the diverting of the flow of fluid from the pipe assembly 28 into the two smaller flow ports and the absorption of vibration and noise by the air chambers 52, the microspheres formed by the glass spheres increase the absorption of vibration and noise as the fluid passes through the insert 12.

A benzoate ester of dipropylene glycol or polyethylene glycol, preferably of the type manufactured by Velsicol Chemical Corp. under the trade name Benzoflex, and 4, 4-methylenebis are added to the prepolymer and glass sphere mixture and heated to about 190 degrees Fahrenheit. The heated mixture is then poured into the heated mold containing the compression springs 30. The molds are allowed to stand for approximately 12 minutes at a constant temperature of about 190 degrees Fahrenheit and then placed into a press to achieve final cure of the male and female halves 34 and 36, respectively, of the elastomer insert 12.

The cured halves 34 and 36 of the elastomer insert 12 are then sanded or otherwise roughened on the flat ends 38 thereof and are heated to about 190 degrees Fahrenheit. A small amount of the elastomer pre-polymer is mixed with 4, 4-methylenebis at a temperature of about 190 degrees Fahrenheit and placed on the roughened surface of the flat ends 38 of the male and female halves 34 and 36, ends 38 of the male and female halves 34 and 36, respectively. The halves 34 and 36 are allowed to stand until the surface of the flat ends 38 becomes tacky. The halves 34 and 36 are then pressed together, aligning the dowel joints, and allowed to cure for 12 hours at a temperature of about 212 degrees Fahrenheit to form the elastomer insert 12.

Thus, the method of manufacture results in a cast elastomer insert 12 having microspheres equal to about 40 percent air by volume of the insert 12, compression spring reinforced flow ports 34 and 36 with different diameter porting, and internal air chambers 52 for effectively and efficiently absorbing and dampening the sounds, pump surges and flushing noises and vibrations of a hydraulic system at a reduced manufacturing cost, thereby reducing the overall cost of the elevator in which the muffler is installed.

The operation of the present invention is not fully understood. It is theorized that by directing the fluid through the muffler 10 through flow ports 24 and 26 of different diameters, the vibration and sound waves traveling through the fluid are subdivided and the frequency thereof divided, thereby forming waves of different frequencies tending to cancel out one another. In addition, the longitudinally extending air chambers are believed to afford substantial absorption of the vibration and sound waves traveling through the fluid. Likewise, the microspheres contained within the elastomer are believed to increase absorption of vibration and sound waves traveling through the fluid.

Although a preferred embodiment of the invention has been illustrated in the accompanying Drawings and described in the foregoing Detailed Description, it will be understood that the invention is not limited to the embodiment disclosed but is capable of numerous rearrangements and modifications of parts and elements without departing from the spirit of the invention.

We claim:

1. Apparatus for reducing fluid flow noise and vibration in a fluid path comprising:
    housing means;
    an insert having first and second opposed ends, said first end including an inclined surface, and comprised of two distinct halves, each having a flat end and an inclined end and being abuttingly attachable to one another at the flat ends;
    at least two separate through ports of different diameters extending longitudinally through the insert between the first and second ends such that an incoming flow of fluid is split into at least two streams by the inclined surface of the insert; and
    means for connecting said housing to the fluid ports.

2. Apparatus for reducing fluid flow noise and vibration in a fluid path comprising:

housing means;

an insert having a body and first and second opposed ends, said first end including an inclined surface, and comprised of two distinct halves, each having a flat end and an inclined end and being abuttingly attachable to one another at the flat ends;

at least two separate through ports extending longitudinally through the insert between the first and second ends such that an incoming flow of fluid is split into at least two streams by the inclined surface of the insert;

a multiplicity of enclosed hollow chambers embedded within the body of the insert and extending outwardly from the center of the body, parallel to the flow ports, to a point away from the first and second ends of the insert; and means for connecting said housing to the fluid ports.

* * * * *